United States Patent [19]
Carr

[11] Patent Number: 6,130,464
[45] Date of Patent: Oct. 10, 2000

[54] LATCHING MICROACCELEROMETER

[75] Inventor: William N. Carr, Montclair, N.J.

[73] Assignee: Roxburgh Ltd., Douglas, United Kingdom

[21] Appl. No.: 08/925,202

[22] Filed: Sep. 8, 1997

[51] Int. Cl.[7] .................................................. H01L 29/82
[52] U.S. Cl. .................. 257/417; 73/491; 73/514.15; 337/70; 337/298
[58] Field of Search ................................ 257/415, 418; 337/70, 77, 298; 73/488, 491, 492, 514.15

[56] References Cited

U.S. PATENT DOCUMENTS

| | | |
|---|---|---|
| 4,071,838 | 1/1978 | Block . |
| 4,284,862 | 8/1981 | Overman et al. . |
| 4,600,934 | 7/1986 | Aine et al. . |
| 4,809,552 | 3/1989 | Johnson ............................. 73/517 R |
| 4,891,255 | 1/1990 | Ciarlo . |
| 5,712,609 | 1/1998 | Mehregany et al. .................... 337/70 |

OTHER PUBLICATIONS

IEEE Transaction on Electron Devices, vol. 35, No. 6, Jun. 1988, pp. 758–763, W. Riethmuller et al., "Thermally Excited Silicon Microactuators".

J. Micromech. Microeng., 2 (1992) 10–13, D. R. Ciarlo, "A Latching Accelerometer Fabricated by the Anisotropic Etching of (110) Oriented Silicon Wafers".

The 8th International Conference on Solid–State Sensors and Actuators and Eurosensors IX, Jun. 25–29, 1995, vol. 1, pp. 417–420, Seung S. Lee et al., "Self–Excited Piezoelectric Cantilever Oscillators".

*Primary Examiner*—Sara Crane
*Attorney, Agent, or Firm*—Ohlandt, Greeley, Ruggiero & Perle, L.L.P.

[57] ABSTRACT

A surface micromachined microaccelerometer includes a substrate which has a surface plane, and a cantilever formed on the substrate with a fixed end and a free end, the fixed end being anchored to the substrate. The cantilever includes a mass fixed along the length of the cantilever. A cooperating device reads out the occurrence of an acceleration event when the free end of the cantilever has moved to a predetermined position. The cooperating device may be fixed or an opposing co-aligned cantilever structure. In a first embodiment, the cooperating device takes the form of a fixed structure having slots in which the tip of the cantilever is selectively retained. A further embodiment configures the cooperating device as an overlapping opposed cantilever. A further feature of the invention enables a reset function of a latched cantilever and comprises a pair of layers which when energized cause a cantilever to be suitably deflected so as to return from the latched state back to the unlatched state.

17 Claims, 7 Drawing Sheets

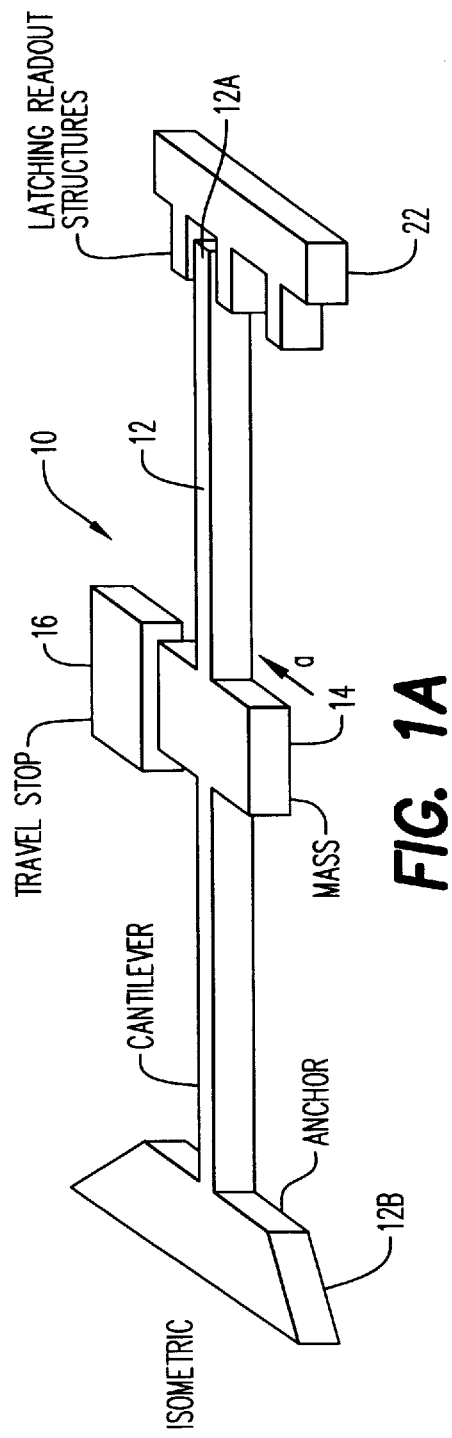
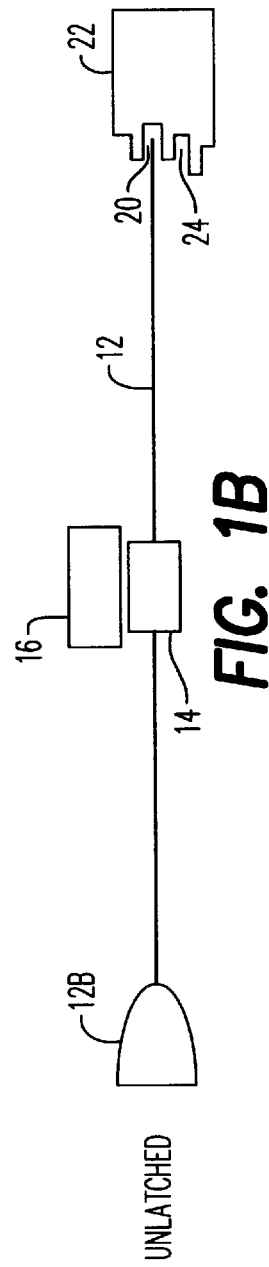
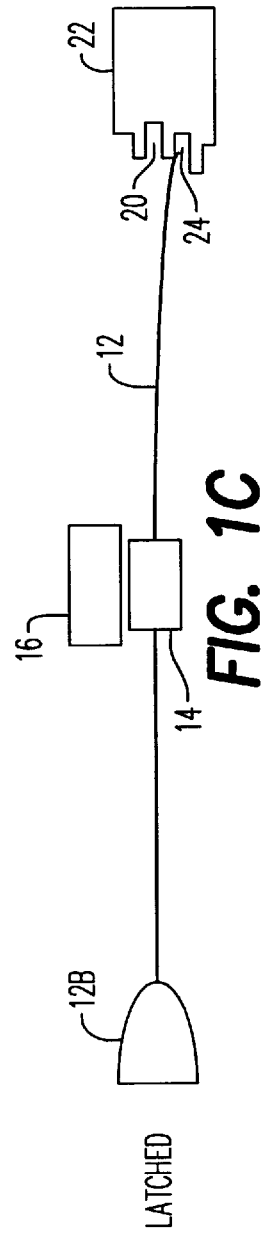
FIG. 1A
FIG. 1B
FIG. 1C

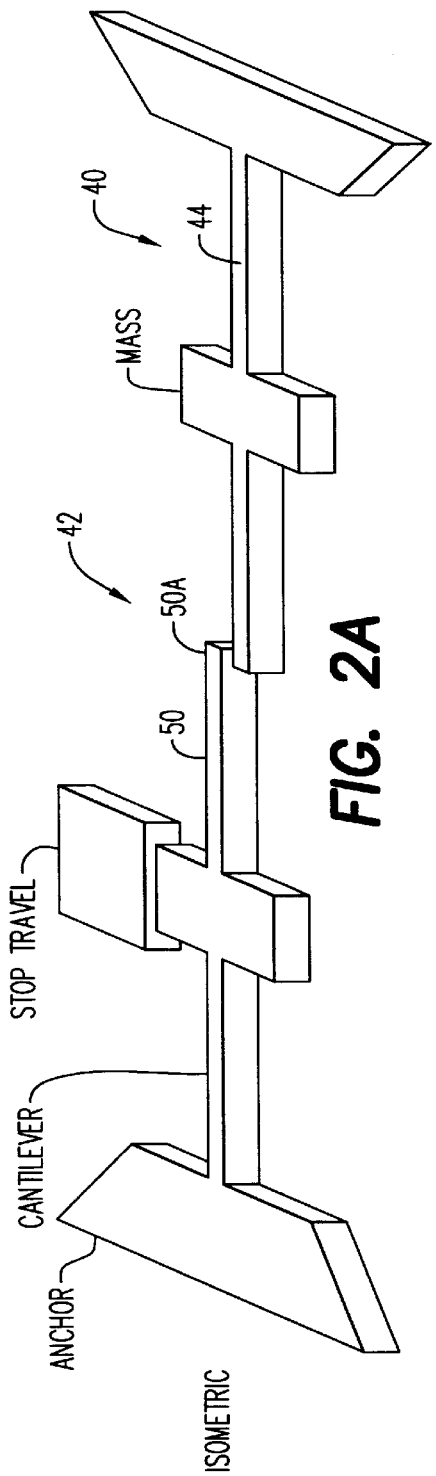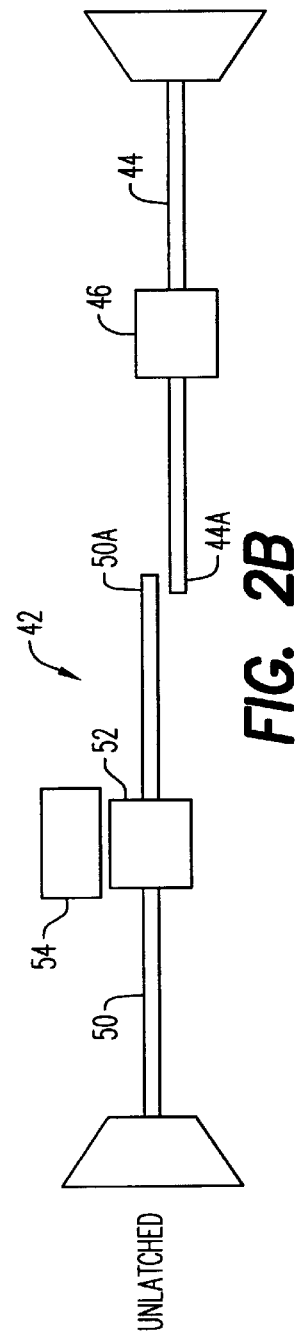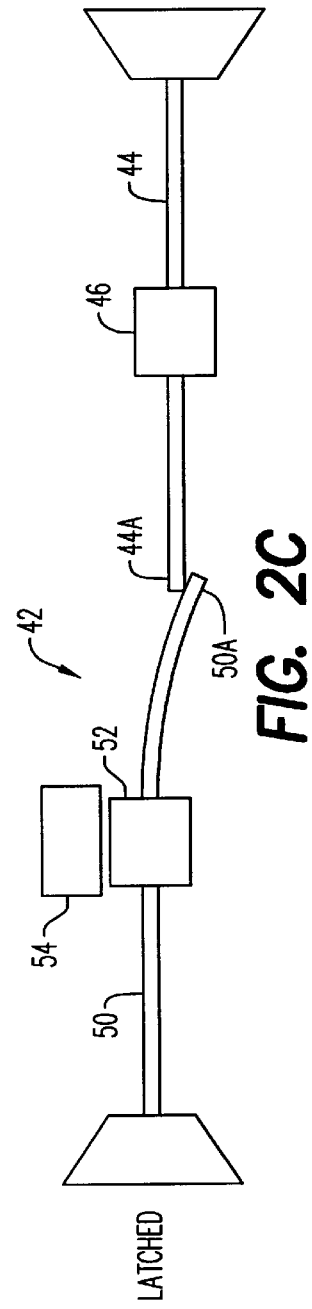

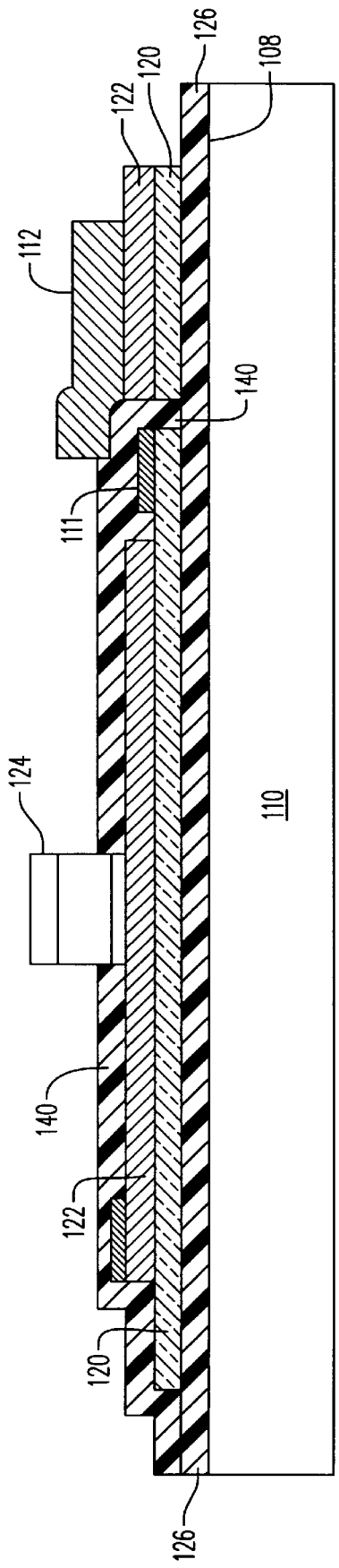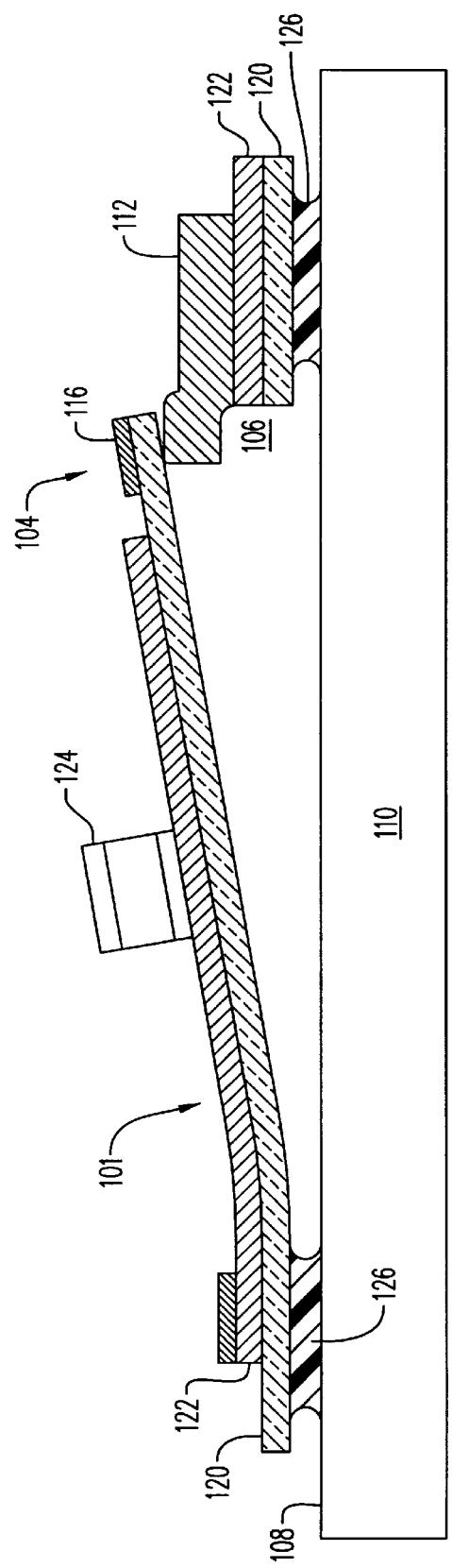
FIG. 3B
FIG. 3C

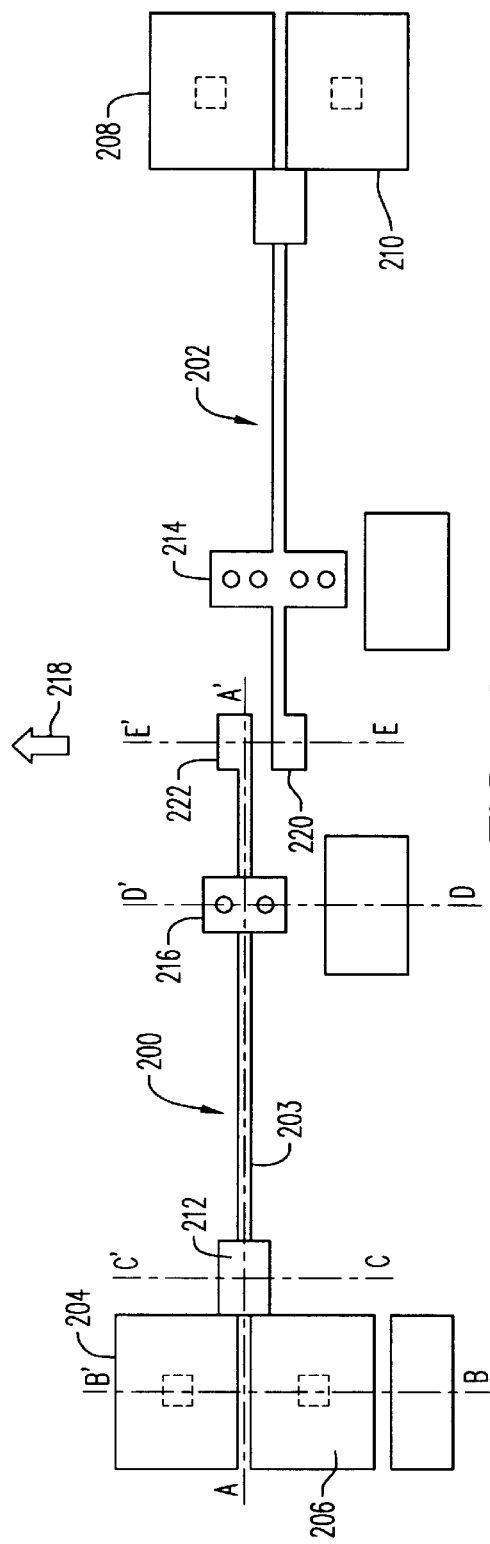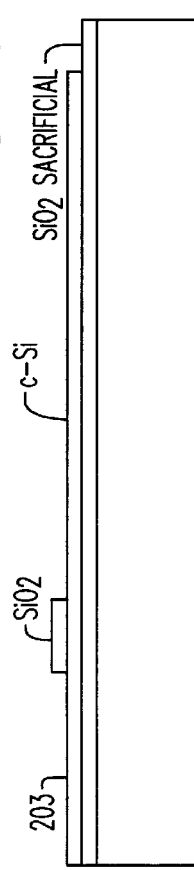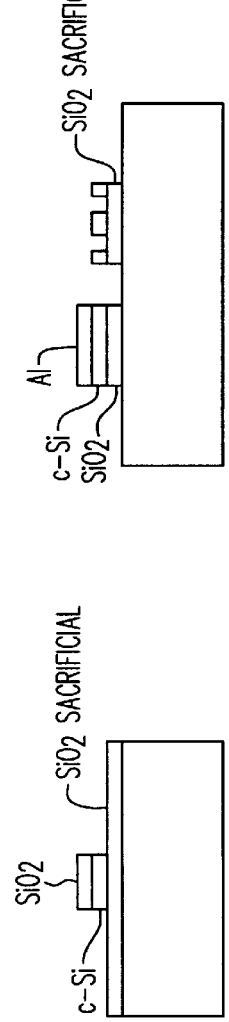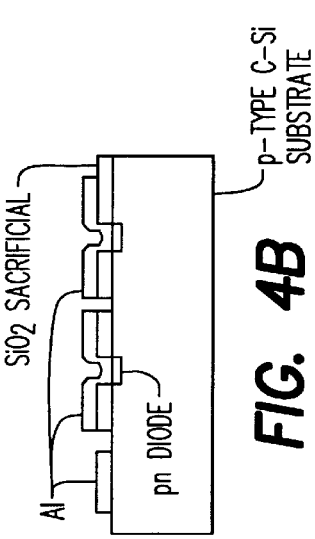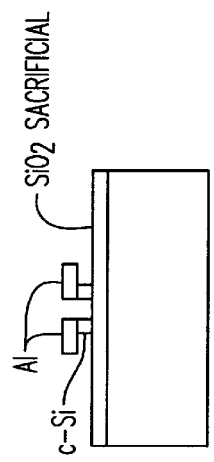
FIG. 4
FIG. 4A
FIG. 4B
FIG. 4C
FIG. 4D
FIG. 4E

LATCHING MICROACCELEROMETER

The present application is related to an application Ser. No. 08/787,281 filed Jan. 24, 1997, such applications sharing common principles of microstructural fabrication.

FIELD OF THE INVENTION

This invention relates to microstructures that are constructed utilizing semiconductor and thin film fabrication processes and more particularly to a cantilevered microstructure that is designed to respond to acceleration events.

BACKGROUND OF THE INVENTION

An understanding of the common approach taken to microstructural fabrication can be obtained by reference to the above cited co-pending patent application Ser. No. 08/787,281. In that application, a basic silicon "micromachining" technique is described as a means for accurately fabricating small structures or devices. In particular, such processing involves a selective surface processing of a silicon substrate to form an anchored cantilever microstructure, as well as the selective deposition thereon and patterning of thin film layers of dielectrics, semiconductors and similar materials. Electrothermal control of the movement of the cantilever is disclosed.

It will be appreciated that the microstructures described in the referenced application 08/787,281 exhibit substantial ranges of motion of the free ends of the cantilevers involved such that latched switching action can be readily obtained.

A particular field of application for microstructures has been that in which the cantilever device functions to record whether or not a certain acceleration was applied to a given mechanism—without requiring battery voltage. This is especially advantageous for use in monitoring parcels, boxes, and crates in shipment and for care in handling and the like. See, in particular, U.S. Pat. No. 5,891,255 to Ciarlo in which there is disclosed a bulk machining method for etching a <110> silicon wafer to produce first and second, orthogonally oriented, cantilever beams, which bend parallel to the surface of the wafer in response to acceleration events. Ciarlo uses a bulk micromachining action wherein the preferential etch rate of a silicon wafer is used to enable an etch action to go completely through a wafer so as to create the oriented beam structure. The length of the first cantilever structure forms an angle with the length of the second cantilever, where the value of the angle is substantially 70.5° or 109.5° and no other orientations are permissible. The apparatus disclosed therein provides a specific configuration and a relationship between the first and second silicon semiconductor cantilever beams in fulfilling the objective of obtaining a latched state for the device or apparatus.

Surface micromachining is widely used in the configuration of semiconductor devices. Such surface micromachining comprises the steps of depositing a material layer, applying and patterning a photoresist layer and using the patterning to enable selective etching or deposition of dopants. A repetition of these steps enables the creation of a three dimensional semiconductor arrangement which is inexpensive and easily controllable.

Accordingly, it is a primary object of the present invention to provide single or multiple latching effects in a microaccelerometer, effectuating thereby the recording of changing acceleration values.

Another object is to fulfill the primary object in ways that are compatible with standard surface micromachining processes.

Another object is to permit sensing of acceleration vectors over a range of directions beyond limitations of the prior art.

An ancillary object is to record the acceleration event by means of a variety of "readout" devices or schemes in which the mechanically latched state is realized and made apparent to an observer directly, or by means of electrical or optical techniques Other and further objects, advantages and features of the present invention will be understood by reference to the following specification in conjunction with the annexed drawings, wherein like parts have been given like numbers.

SUMMARY OF THE INVENTION

The present invention fulfills the above stated objects by teaching how to provide various embodiments of a microaccelerometer device for indicating or representing an acceleration event by the mechanical latching of a cantilever responsive to the force due to acceleration. In accordance with such teaching, no expenditure of power is required, the efficient flexure of the cantilever acting to move the tip or free end thereof so that its slight accurate movement is sensed by fixed or movable sensing or readout devices.

Accordingly, the present invention is broadly defined as a surface micromachined microaccelerometer for indicating or representing an acceleration event including a substrate which has a surface plane, and a cantilever formed on the substrate with a fixed end and a free end, the fixed end being anchored to the substrate. Moreover, there is an actuating structure for moving the cantilever responsive to an acceleration event, and it includes a mass fixed along the length of the cantilever. Further, a cooperating device reads out the occurrence of an acceleration event when the free end of the cantilever has moved to a predetermined position. The cooperating device may be fixed or an opposing co-aligned cantilever structure.

In accordance with a first specific feature of the invention, the means for reading out the occurrence of an acceleration event takes the form of a fixed structure having slots in which the tip of the cantilever is selectively retained, or tethered, the slots being—in the usual case—two in number, but defined by a plurality of projections extending from the fixed structure. There is an unlatched position for the cantilever tip in a first slot defined by first and second projections, whereas the second projection and a third projection form a second slot defining a second or latched position.

An alternate readout means takes the form of confronting or overlapping opposed cantilevers, one being the primary cantilever having a mass fixed along its length and the other the response, or readout, cantilever having a similar mass along its length.

A further feature of the present invention is applicable in situations where a reset function is required. For example, in many applications a reset operation, following the latching event, is needed for purposes of testing and to enable repeated usage of the device. In those instances where a reset function is called for, an electrical current is applied to a layer of the cantilever much in the way described in co-pending application 08/787,281 such that the cantilever is suitably deflected so as to return it from the latched state back to the unlatched state. The disclosure of this co-pending application is incorporated herein by reference.

DESCRIPTION OF THE DRAWINGS

FIG. 1 illustrates a configuration for a microcantilever accelerometer in which a fixed position readout means is employed; and in which FIG. 1A is an isometric plan view of the configuration, FIG. 1B shows the accelerometer in the unlatched position and FIG. 1C in the latched position.

FIG. 2 depicts a configuration for the cantilever accelerometer in which the readout is accomplished by a complementary response or readout cantilever in a tip to tip relationship with the primary cantilever and in which FIG. 2A is an isometric plan view, FIG. 2B is a view showing the unlatched position and FIG. 2C showing the latched position.

FIG. 3B is a side sectional view of the out-of-plane sensor of FIG. 3A, prior to removal of release layers.

FIG. 3C is a side sectional view of the out-of-plane sensor of FIG. 3A, after being subjected to an acceleration event.

FIG. 4 is a plan view of a cantilever accelerometer structure in accord with the invention, wherein a reset layer is incorporated into the structure.

FIGS. 4A–4E are sectional views of the cantilever accelerometer structure of FIG. 4, prior to removal of a sacrificial layer and along lines A—A, B—B, C—C, D—D and E—E respectively.

DESCRIPTION OF PREFERRED EMBODIMENTS

Figure 3A:
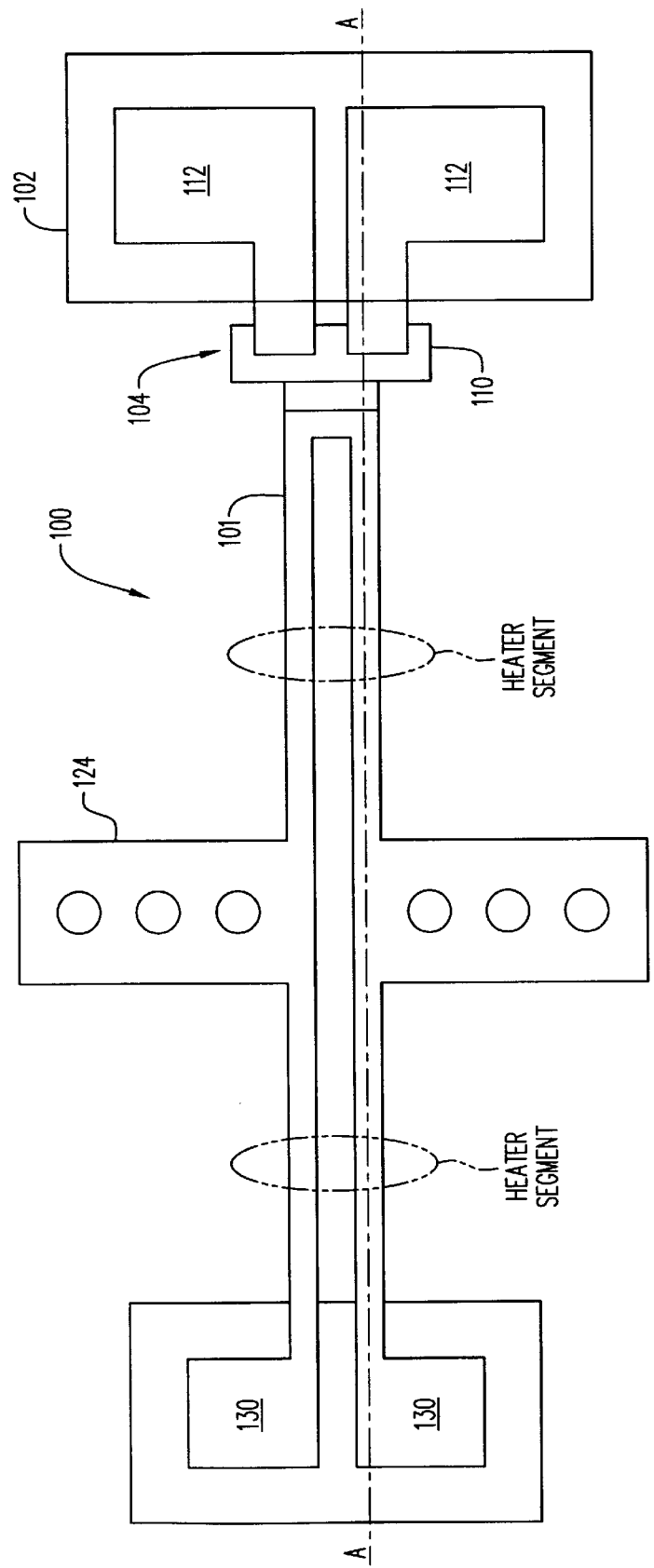
FIG. 3A depicts a plan view of an out-of-plane sensor with a fixed readout means.

The microstructures which will be described herein, are fabricated using standard surface machining semiconductor processes, as have been practiced for years in producing integrated circuits and similar technologies, commonly known as microelectromechanical (MEMS) technologies. These technologies for fabricating the structures and devices of the present invention are per se well-known to practitioners of these technologies or arts; but it will be appreciated that a uniqueness of the present invention lies in the additive application of thin films which are then selective etched to achieve the particular structures in which the latching microaccelerometer is embodied.

It will be apparent that various substrates can be used in forming the basic latching accelerometer, including semiconductor, glass, ceramic or metal. The processing is generally carried out in clean rooms generally using thin disks of a starting material. In the preferred embodiments the preferred material is a semiconductor substrate since such is amenable to formation of the desired structures, using readily available additive, thin film/etch techniques. A quartz or ceramic substrate is an alternative substrate material for such embodiments and in some cases may result in devices that are lower in cost and possess similar capabilities compared to the most preferred semiconductor substrate starting material.

In one embodiment hereof, a semiconductor material is used that is a sandwich of silicon/silicon dioxide/silicon commonly known as silicon-on-insulator or SOI. The top layer of silicon can be obtained in the correct thickness for optimum shaping of the cantilever of the device with a minimum internal stress component. It is desirable to fabricate the cantilever structure with a film component that is as stress free as possible to result in an alignment of the cantilever tip, or free end, into a predictable and repeatable vertical elevation above the substrate.

Accordingly, one of the preferred embodiments to be described utilize SOI as the starting silicon wafer material with the top silicon layer five to twenty microns in thickness and the intermediate silicon dioxide layer in the range of 0.3 to 1 micron in thickness. This SOI starting material is manufactured using known bonding/etchback or hydrogen/oxygen implant technology.

There are several basic structural configurations for the preferred embodiments: that of FIG. 1 consists of an acceleration force-actuated cantilever which is latchable into a fixed readout structure. In the FIG. 1A isometric view, the device 10 has cantilever 12 in its initial, unlatched (unactuated) position, which is a position assumed immediately following the structural release of the cantilever 12, after formation by a surface micromachining process.

It will be seen that a force responsive mass 14 is affixed to cantilever 12 and that the cantilever terminates in a free end or tip 12A. Also cantilever 12 is anchored at its other end to the substrate by the anchor or frame 12B. With a mass 14 attached, preferably substantially midway between anchor 12B and tip 12A, the cantilever will be flexed appreciably when mass 14 is affected by a seismic force or the like. Thus, it will be understood that the accelerometer device of FIG. 1 works with an acceleration (a) applied onto mass 14 and cantilever 12 in a direction generally parallel to the support surface. In this way, an in-plane force proportional to the applied acceleration is exerted on the mass and cantilever, causing an angular deflection of the cantilever structure. With acceleration, it deflects and retracts longitudinally at the same time. As the acceleration exceeds a threshold value, the cantilever retracts laterally over the notch 20 formed in tether, or readout, structure 22 and becomes restrained in notch 24.

It is to be understood that the principle of the invention can be extended to second, third and higher outer tether notches which are encountered in response to higher level acceleration events.

An optional feature in accordance with the invention is also seen in FIG. 1. In order to prevent undesirable effects, that is, to prevent sensitivity due to acceleration forces in several lateral directions, a travel stop 16 is shown slightly spaced from the mass 14 and confronting same. Without travel stop 16, the cantilever can be inadvertently reset to its initial position following an acceleration actuation event. In such case, an observer would not be able to determine whether an acceleration event had actually occurred.

Another preferred embodiment is seen in FIG. 2, (FIG. 2A being an isometric view), in which a movable readout means 40 is provided for the accelerometer 42. The readout means takes the form of another cantilever 44 that is axially parallel with a cantilever 50 which forms the left portion of accelerometer 42.

The second or readout cantilever 42 is illustrated in the plan views of FIGS. 2B and 2C, 2B showing the unlatched position and 2C the latched position. The primary cantilever free end or tip 50A moves from one side to the other of the tip 44A readout cantilever 44 responsive to the force of acceleration imposed on the device 42. This is due to the clockwise movement with bending or flexure of the cantilever 50. Thus, from the cantilever position shown in FIG. 2B, the primary cantilever 50 (the one to the left) has moved to its final configuration as seen in FIG. 2C. The two cantilevers remain in this final position even with further strong impulses of actuating force due to acceleration.

As before in FIG. 1, the mass 52 and confronting travel stop 54 are provided on the primary sensing cantilever 50 whereas only a mass is affixed to the cantilever of the secondary or readout cantilever.

It will be understood by one skilled in the art that FIGS. 1 and 2 illustrate movement of the sensing cantilever device in the top plane of the substrate of semiconductor material or the like, which is characterized as lateral movement, (the length and width dimensions of the substrate lying in such plane). However, the concept is easily extended to similar structures fabricated on that plane of the substrate but with a stacked film configuration permitting the primary sensing cantilever to be actuated vertically (See FIG. 3). The microaccelerometer is thus able to measure vertical force due to acceleration in such a configuration. Moreover, this configuration is particularly illustrative of an additional specific feature of the present invention, i.e., the providing of a reset operation, that is, an operation to unlatch a previously set or latched cantilever accelerometer device.

In FIG. 3 there will be seen an out-of-plane sensor including a cantilever structure and a fixed readout for the latching of such structure or device. FIG. 3A is a plan view of such configuration whereas side views are shown in FIGS. 3B, C, and D, the first prior to release, the second after release and after an actuating acceleration event, and the third, a further side view of the released cantilever structure self actuating into the reset position.

As background to an understanding of the FIG. 3 embodiment, reference may be made to cited co-pending application 08/787,281 specifically to FIG. 4 thereof which depicts a so-called "inchworm" cantilever configuration. This precise configuration is for a thermally activated cantilever structure having a range of flexed movements for effectuating closing and latching of switches or for other purposes. The flexed movement effects described therein result from selective bonding of a film or films on a base layer whose temperature coefficients of expansion (TCEs) differ substantially, to which film or films appropriate voltage is applied to produce the required heating. The flexed movement effects may also be derived from a sandwich structure including piezoelectric material as depicted in the aforesaid co-pending application.

Referring now to FIG. 3, there is shown an out-of-plane sensor 100 having a cantilever structure 101 similar to those already described and shown in FIGS. 1 and 2. The cantilever structure herein is provided with a fixed readout structure 102, similar to the embodiment of FIG. 1, wherein the tip or free end 104 of the cantilever is designed to be tethered or contained within a notch 106 formed in the structure. (FIG. 3C) Unlike the embodiments of FIGS. 1 and 2, however, in which the movement of the cantilever is lateral with respect to a reference surface plane 108 of the substrate 110, the movement of the cantilever in FIG. 3 is vertically upward with respect to that surface plane.

It will be understood that the tip or free end 104 is confined prior to an acceleration event within notch 106—which is when the cantilever is in its unlatched position. See FIG. 3C in which the cantilever has been freed or released from the notch 106 responsive to an actuating acceleration event so that it is, at this stage, in its latched position.

In the unlatched position, which is when the cantilever 101 is within notch 106, there will be a continuous metal-to-metal contact because of the presence of broad contact means 111 constituted of a metal 1 (chrome-gold) at the tip of the cantilever 101. Contact means 111 will make contact with the metal bonding pads 112 constituted of a metal 2 (palladium or platinum) thereby forming a normally closed electrical circuit connection which can indicate electrically the unlatched position of the cantilever 101.

The seismic mass 124 (seen in plan view in FIG. 3A) is located substantially at the midpoint of the cantilever length. It is made as thick as reasonable to provide high sensitivity to acceleration per unit area of the sensor device. This mass is achieved by depositing both a metal 1 and metal 2 to form the underlying portion with an overlying final layer of electroplated metal (metal 3) such as copper to form a relatively massive device to aid in the appropriate actuation of the cantilever 101.

FIG. 3B shows the cantilever structure in the formative stages on the substrate, prior to release. A sacrificial film 126 is seen underlying the cantilever 101, and also separating the cantilever tip 104 from the fixed readout structure 102. As noted previously, the cantilever 101 moves upward slightly due to its own thermal TCE mismatch of the bimorph layers 120 and 122 such that the metal contact means 111 at the tip 104 causes shorting of the two bonding or pads 112 on the fixed readout structure so as to obtain the desired electric continuity. Following release—and thereafter following an acceleration event—the cantilever 101 will have rotated upward above the substrate such that the tip 104 has moved out of the initial position (unlatched) into the latched position as seen in FIG. 3C. As will be appreciated, this movement is due to flexure of the cantilever due to the bimorph action.

In the position shown in FIG. 3C there is no electrical continuity between the two bonding pads 112 of the fixed readout structure, this now indicating that the device is in a latched position. The movement of the cantilever 101 from the unlatched to the latched position can occur only with an actuation due to the force of acceleration. Thus the structure of FIG. 3 functions as an accelerometer.

It may be very desirable to have a reset means for resetting the cantilever 101. For the purpose of providing such reset means, the cantilever 101 is formed to provide the aforenoted thermal bimorph. This bimorph is constituted of the lower layer of silicon dioxide 120 and the upper layer 122 of tantalum silicide (TaSi2). The upper layer 122 is preferably formed in sections or segments, and is chosen to have a higher temperature coefficient of expansion (TCE) than the lower layer 120.

Figure 3D:
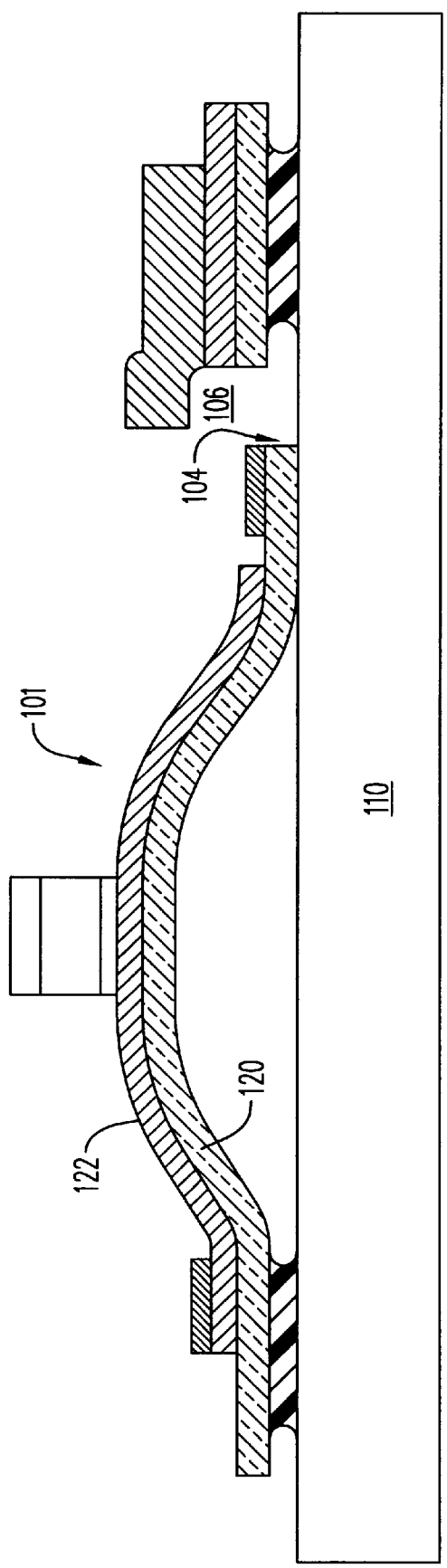
FIG. 3D is a side sectional view of the out-of-plane sensor of FIG. 3A, during a reset operation.

The reset operation is accomplished by heating the actuating segments of layer 122 of the cantilever to create an upward—bowed shape shown in FIG. 3D. Such an action is accomplished by selectively applying a voltage to bonding pads 130 (FIG. 3A) to cause current flow through layer 122. FIG. 3D is characteristic of the thermal bimorph, when fully heated tending to rotate the cantilever downward. The reduction in effective length of the cantilever causes the tip to move downward toward the substrate 110. As the thermal actuator segments of the cantilever cool, the tip 104 moves into the tethered position, as noted before, in the notch 106, under the overhanging metal pad structure 112 of the fixed readout means 102 to remain in the unlatched position. The film thicknesses along the cantilever 101 are adjusted to provide the desired mix of thermal coefficients of expansion (TCEs) for optimum operation of the device.

The person skilled in the art will appreciate that the device of FIG. 3 is typically fabricated beginning with a semiconductor wafer substrate 110 which is coated with spin-on polyimide 126, preferably to a thickness of approximately 1.0 micron. Next, the layers 120 of $SiO_2$ and 122 of tantalum silicide are deposited to constitute the cantilever beam, followed by a metal film of chrome-gold deposited for the tip metalization 104 and the bonding pad metalizations 112 and 130. Another layer 140 of polyimide is then deposited overall to form the separation between the cantilever tip and the overlying fixed readout metal pads 112. The layer 140 of polyimide is removed with an oxygen plasma from overall covering of the wafer. The oxygen. plasma action on the polyimide is terminated prior to removal of the underlying foundation of pedestal 142 for the cantilever (seen on the left), as well as for the fixed readout structure (seen on the right).

It will be understood that the same principle involving reset of the cantilever device 101 is also applicable to the earlier described embodiments of FIGS. 1 and 2. Thus, one can effectuate a reset operation in their cases. An appropriate film or layer is overlaid on the cantilevers seen therein with a suitable TCE that differs from the TCE of the underlying cantilever layer. This is done in order that the cantilever will be similarly flexed in response to thermal actuation when electrical power is applied; and thereafter returned to an initial position.

Referring to FIGS. 4 and 4A–4E, a microaccelerometer structure is illustrated which includes a reset layer present on at least one of the cantilever structures. As shown in the plan view of FIG. 4, a pair of cantilevers 200 and 202 extend parallel to a supporting surface (not shown). Each cantilever structure comprises a crystalline silicon material 203 which further extends beneath pairs of contact regions 204, 206 and 208, 210, respectively. Contact regions 204 and 206, for example, are physically separated, but electrically connected by underlying crystalline silicon layer 203, which further provides the anchor for cantilever 200.

An expanded section of the crystalline silicon layer 203 underlies a silicon dioxide layer 212 at the proximal end of cantilever 200. Silicon dioxide layer 212 and underlying crystalline silicon layer 203 have different thermal coefficients of expansion. Thus, when a current is supplied between contact regions 204 and 206, crystalline silicon layer 203 is heated, as is silicon dioxide layer 212. Because crystalline silicon layer 203 expands at a faster rate than silicon dioxide layer 212, cantilever 200 is caused to bend upwards (out of the plane of the page) as a result of the differential expansion of the aforesaid layers.

FIGS. 4A–4E are side sectional views along corresponding section lines in FIG. 4, illustrating the various layers of materials employed in the microcantilever structures, prior to release through etching of a silicon dioxide sacrificial layer.

Mass 214, which forms a portion of cantilever 202, is configured to be substantially larger than mass 216 that forms a portion of cantilever 200. Accordingly, when a structure of FIG. 4 is subjected to an acceleration event that is directed along an axis indicated by arrow 218, cantilever 202 is subjected to a greater degree of flexure than is cantilever 200. Accordingly, end 220 of cantilever 202 is caused to slide past end 222 of cantilever 200 and to be latched thereby into an overlapping position.

In order to reset the respective cantilevers to their original unlatched positions, a current is applied between contacts 204 and 206 to cause a differential heating between crystalline silicon layer 203 and silicon dioxide layer 212. The differential heating causes cantilever 200 to flex upwardly and away from the underlying substrate, thereby enabling end 222 to disengage from end 220 At such time, cantilever 202 returns to its unlatched position. Thereafter, the heating current is removed from contacts 204 and 206 and cantilever 200 relaxes to its unlatched position.

To detect whether ends 220 and 222 are in a latched or unlatched state, a voltage between a pair of opposed contacts, e.g., 204, 208 or 206, 210 is applied. If ends 220 and 222 are latched, they will be in physical contact and will enable a complete circuit between the respective contacts. Otherwise, they will be separated as shown in FIG. 4. To prevent any incidental contact in the unlatched state, insulating layers can be deposited on the facing surfaces of ends 220 and 222.

Figure 5:
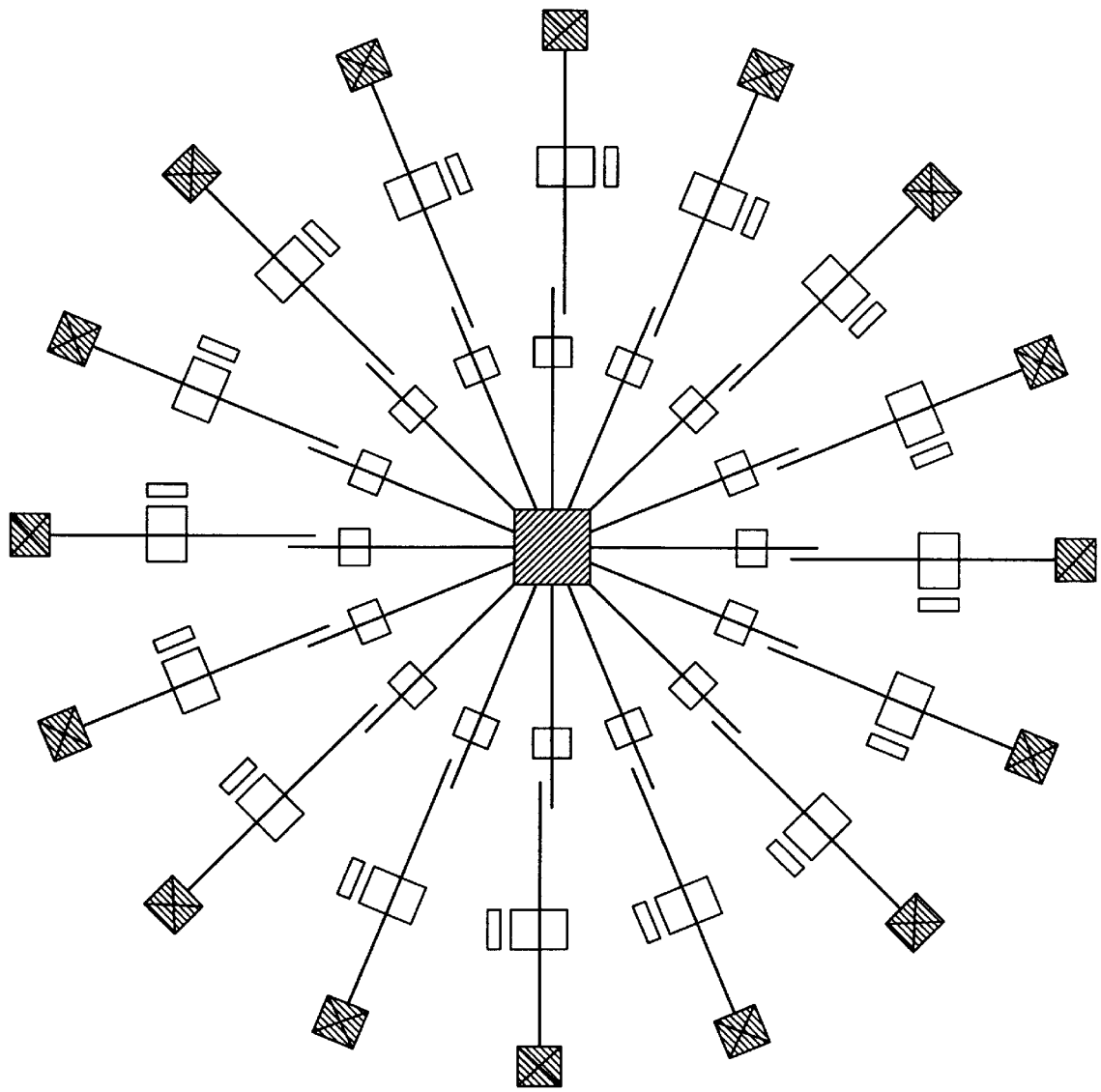
FIG. 5 is a plan view of a latching cantilever structure which is able to indicate accelerations along many axes.

Turning now to FIG. 5, a schematic view illustrates a radial positioning of a plurality of cantilever structures, each configured much the same as shown in FIG. 4. In such an arrangement, any acceleration event in the plane of the cantilever microstructures will be indicated by a latching of one or possibly a few of the microcantilevers. By sensing which of the cantilevers are latched, an indication of the general direction of acceleration can be determined.

What has been disclosed herein is a microaccelerometer device and apparatus for responding to acceleration events from one or a plurality of directions and to acceleration thresholds at successively different levels. The basic device takes a variety of forms; one involving a fixed readout means, another a movable readout scheme such as a second cantilever. Several other embodiments which differ in their modes of operation have been described. A first operates to respond to acceleration which is lateral with respect to a reference surface plane of the substrate; the second operates to respond to acceleration which is transverse (vertical) with respect to the reference surface plane.

The invention having been thus described with particular reference to the preferred forms thereof, it will be obvious that various changes and modifications may be made therein without departing from the spirit and scope of the invention as defined in the appended claims.

What is claimed is:

1. A microaccelerometer device for indicating an acceleration event comprising:

a substrate having a surface plane;

a first cantilever formed from a material layer deposited on said substrate and having a fixed end and a free end, the fixed end being anchored to said substrate, said first cantilever having a mass affixed thereto;

latch means formed from a material layer deposited on said substrate for unlatching said first cantilever in a first position thereof and, for latching said first cantilever when the free end of said first cantilever has moved to a predetermined position, to indicate an occurrence of an acceleration event;

conductor means coupled between said latch means and said first cantilever for enabling dispatch therefrom of a signal indication of a latched state or an unlatched state of said first cantilever; and stop means positioned to confront said mass for controlling unwanted movement of said first cantilever in a direction opposite to a direction of the movement being read out.

2. A microaccelerometer device as defined in claim 1, wherein said microaccelerometer device is formed by surface micromachining of said substrate and material layers deposited on said substrate.

3. A microaccelerometer device as defined in claim 1, wherein the first cantilever lies parallel to the surface plane of the substrate and said substrate is positioned so that an acceleration event causes movement of said first cantilever in a direction that is lateral with respect to said surface plane.

4. A microaccelerometer device as defined in claim 1, wherein the first cantilever lies parallel to the surface plane of the substrate and said substrate is positioned so that an acceleration event causes movement of said first cantilever in a direction that is orthogonal to said surface plane.

5. A microaccelerometer device as defined in claim 1, wherein said latch means is a fixed structure having a body portion and projections therefrom defining a plurality of notches in which the free end of the first cantilever can be selectively retained.

6. A microaccelerometer device as defined in claim 1, wherein said latch means is a second cantilever having a fixed end and a free end, the free end of said second cantilever confronting and overlapping the free end of the first cantilever.

7. A microaccelerometer device as defined in claim 6, wherein said first cantilever and second cantilever are oriented so that long axes thereof are positioned in a parallel fashion.

8. A microaccelerometer device as defined in claim 7, wherein a plurality of associated ones of first cantilevers and second cantilevers are oriented in a radial fashion about a point on said substrate, thereby enabling a sensing of acceleration events along a plurality of axes parallel to the surface of the substrate.

9. A microaccelerometer device as defined in claim 1, further comprising:

reset means for returning said first cantilever to an unlatched state, actuation of said reset means causing said first cantilever to bend away from said substrate surface plane so as disengage the free end thereof from said latch means and allow the first cantilever to return to the unlatched state.

10. A microaccelerometer device as defined in claim 9, wherein said reset means comprises:

plural material layers evidencing different thermal coefficients of expansion; and means for heating said plural layers to cause a flexure thereof and a flexure of said first cantilever.

11. A microaccelerometer device as defined in claim 9 wherein said reset means comprises:

multiple material layers including a sandwich with two opposing conducting electrodes disposed on a piezoelectric film; and means for applying a voltage to said conducting electrodes to cause a flexure of said piezoelectric film and a flexure of said first cantilever.

12. A microaccelerometer device as defined in claim 7, further comprising:

reset means for returning said first cantilever to an unlatched state, actuation of said reset means causing at least one of said first cantilever or second cantilever to bend away from said substrate surface plane so as to disengage a latched free end thereof and allow the first cantilever to return to the unlatched state.

13. A microaccelerometer device as defined in claim 12, wherein said reset means comprises:

plural material layers evidencing different thermal coefficients of expansion; and means for heating said plural layers to cause a flexure thereof and a flexure of an associated cantilever.

14. A microaccelerometer device as defined in claim 13 wherein said reset means comprises:

multiple material layers including a sandwich with two opposing conducting electrodes disposed on a piezoelectric film; and means for applying a voltage to said conducting electrodes to cause a flexure of said piezoelectric film and a flexure of said first cantilever.

15. A microaccelerometer device for indicating an acceleration event comprising:

a substrate having a surface plane;

a cantilever formed from a material layer on said substrate and having a fixed end and a free end, the fixed end being anchored to said substrate;

actuating means for moving said cantilever responsive to an acceleration event such that said cantilever bends transversely out of said surface plane of said substrate;

latch means formed from a material layer deposited on said substrate for latching the free end of said cantilever prior to occurrence of an acceleration event, said latch means configured as a fixed structure having a body portion and projection therefrom defining at least one notch in which the free end of the cantilever can be retained; and means for reading out the occurrence of an acceleration event when the free end of said cantilever has moved to an unlatched position.

16. A microaccelerometer device as defined in claim 15, in which the length and width of the cantilever lies in the substrate surface plane, and the movement of said cantilever is orthogonal with respect to said surface plane.

17. A microaccelerometer device as defined in claim 15, further comprising:

reset means for returning said cantilever to a latched state, actuation of said reset means causing a portion of said cantilever to bend away from said substrate surface plane so as re-engage the free end thereof with said latch means.

* * * * *